(12) United States Patent
Luo

(10) Patent No.: US 9,408,317 B1
(45) Date of Patent: Aug. 2, 2016

(54) HANDLE STRUCTURE AND ELECTRONIC APPARATUS HAVING SAME HANDLE STRUCTURE

(71) Applicant: Wistron Corporation, New Taipei (TW)

(72) Inventor: Xiren Luo, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/731,923

(22) Filed: Jun. 5, 2015

(30) Foreign Application Priority Data

Jan. 20, 2015 (CN) .......................... 2015 1 0028445

(51) Int. Cl.
*G06F 1/16* (2006.01)
*H05K 5/02* (2006.01)
*H05K 5/00* (2006.01)

(52) U.S. Cl.
CPC .............. *H05K 5/023* (2013.01); *H05K 5/0017* (2013.01); *H05K 5/0234* (2013.01)

(58) Field of Classification Search
CPC combination set(s) only.
See application file for complete search history.

(56) References Cited

U.S. PATENT DOCUMENTS

| 4,951,241 | A | * | 8/1990 | Hosoi | B41J 3/36 |
| | | | | | 361/679.09 |
| 5,235,495 | A | * | 8/1993 | Blair | F16M 11/10 |
| | | | | | 16/445 |
| 5,293,300 | A | * | 3/1994 | Leung | G06F 1/1616 |
| | | | | | 361/679.59 |
| 5,375,076 | A | * | 12/1994 | Goodrich | G06F 1/1626 |
| | | | | | 361/679.17 |
| 6,016,248 | A | * | 1/2000 | Anzai | G06F 1/1626 |
| | | | | | 248/463 |
| 7,206,198 | B2 | * | 4/2007 | Wang | G06F 1/166 |
| | | | | | 312/223.1 |
| 7,576,981 | B2 | * | 8/2009 | Kuo | E05B 73/0005 |
| | | | | | 361/679.57 |
| 7,612,998 | B2 | * | 11/2009 | Fan | G06F 1/1616 |
| | | | | | 361/679.55 |

(Continued)

FOREIGN PATENT DOCUMENTS

| TW | M358994 | 6/2009 |
| TW | 200951677 | 12/2009 |

OTHER PUBLICATIONS

Office Action issued in corresponding Taiwan patent application on Oct. 27, 2015 (and its English translation).

*Primary Examiner* — Lisa Lea Edmonds
(74) *Attorney, Agent, or Firm* — McClure, Qualey & Rodack, LLP

(57) ABSTRACT

A handle structure and an electronic apparatus having the handle structure are provided. A housing of the electronic apparatus has a receiving groove adjacent to one side of the electronic apparatus. The handle structure is pivotally connected to the receiving groove and can be moved opposite to the housing, so as to form a foot mode and a handle mode. In the foot mode, a sliding member of the handle structure is in an accommodating position, and a second end can be locked with a positioning portion in a locking position. When the positioning portion is in a release position, a second end of a sliding member can be detached from the positioning portion and slid to a stretch position, making a handle member exposed out of the receiving groove to form the handle mode.

12 Claims, 9 Drawing Sheets

(56) References Cited

U.S. PATENT DOCUMENTS

| | | | | |
|---|---|---|---|---|
| 7,660,113 B2* | 2/2010 | Kaneko | F16M 13/00 | 361/679.59 |
| 7,898,796 B2* | 3/2011 | Horie | G06F 1/16 | 361/679.02 |
| 7,916,478 B2* | 3/2011 | Tu | F16M 11/10 | 248/398 |
| 7,948,753 B2* | 5/2011 | Wang | G06F 1/1616 | 220/318 |
| 8,111,512 B2* | 2/2012 | Yeh | G06F 1/1624 | 345/156 |
| 8,400,767 B2* | 3/2013 | Yeom | F16M 11/10 | 248/917 |
| 8,508,938 B2* | 8/2013 | Luo | G06F 1/203 | 345/156 |
| 8,649,166 B2* | 2/2014 | Wu | G06F 1/1601 | 361/679.27 |
| 8,670,233 B2* | 3/2014 | Huang | G06F 1/1613 | 16/429 |
| 8,749,963 B2* | 6/2014 | Staats | G06F 1/1632 | 248/121 |
| 8,879,250 B2* | 11/2014 | Franz | F16M 11/10 | 345/211 |
| 8,922,995 B2* | 12/2014 | Su | F16M 11/10 | 248/917 |
| 8,964,376 B2* | 2/2015 | Chen | G06F 1/1656 | 292/169.17 |
| 9,010,822 B2* | 4/2015 | Rasmussen | F16M 11/10 | 248/919 |
| 2006/0050471 A1* | 3/2006 | Chen | G06F 1/1601 | 361/679.22 |
| 2006/0077623 A1* | 4/2006 | Yeh | G06F 1/1601 | 361/679.22 |
| 2009/0296335 A1 | 12/2009 | Cheng et al. | | |
| 2010/0118228 A1 | 5/2010 | Chen et al. | | |
| 2011/0050590 A1* | 3/2011 | Viglione | F16M 11/10 | 345/173 |
| 2012/0044624 A1* | 2/2012 | Hoffman | G06F 1/1628 | 361/679.21 |

* cited by examiner

HANDLE STRUCTURE AND ELECTRONIC APPARATUS HAVING SAME HANDLE STRUCTURE

CROSS-REFERENCES TO RELATED APPLICATIONS

This non-provisional application claims priority under 35 U.S.C. §119(a) on Patent Application No. 201510028445.5 filed in China, P.R.C. on Jan. 20, 2015, the entire contents of which are hereby incorporated by reference.

BACKGROUND

1. Technical Field

The present invention provides a handle structure, and in particular, to a handle structure that is applicable to an electronic apparatus, and optionally supports the electronic apparatus as a foot.

2. Related Art

As the Information Age approaches, computer products, communications products, and consumer electronic products have become one of the fast growing industries in the world. Herein, the computer products are quite widely applied, ranging from use in working, daily life, or entertainment, to the like, and have become one of the essential articles in the life of modern people.

With the development of science and technology and the emerging of the concept of integrity, nowadays, most of the computer products tend to be designed as lightweight, and light computer apparatuses, such as notebook computers, tablet PCs, and all-in-one PCs (AIO PC) are increasingly popular in the market of electronic products.

In an AIO PC, a computer mainframe is diminished and integrated with a display, thereby forming a modular computer apparatus with the appearance similar to a liquid crystal display. Therefore, a body of the AIO PC needs to stand on a table by using a support unit or a foot to facilitate viewing and use of a user. In addition, the AIO PC is further provided with a handle, so as to meet a requirement of convenience of the modern people.

However, the design of a handle structure of a conventional AIO PC may cause inconvenient packaging and placing of the entire machine of the AIO PC, and affect integral beauty of the appearance of the AIO PC. Therefore, how to design a handle structure of an electronic apparatus that can facilitate holding of a user, and save overall package and placing space of the electronic apparatus without affecting integral beauty of the appearance of the electronic apparatus becomes an important issue to be figured out by a person skilled in the art.

SUMMARY

In view of this, the present invention provides a handle structure, applicable to an electronic apparatus. The electronic apparatus includes a housing having a receiving groove, and the receiving groove includes a first end adjacent to a side edge of the housing and a second end opposite to the first end. The handle structure mainly includes a first cover body, a second cover body, a handle member, and a sliding member. The first cover body includes a joint portion and a positioning portion, and the first cover body is rotatably connected to the second end of the receiving groove by using the joint portion. The second cover body can be combined with the first cover body to form a receiving space in between, and the second cover body includes a positioning hole, where when the second cover body is combined with the first cover body, the positioning portion is exposed in the positioning hole, and the positioning portion can be moved, opposite to the positioning hole, between a release position and a locking position. The sliding member has a first end and a second end, and the first end of the sliding member is connected to the handle member. The sliding member is slidably received in the receiving space and can be slid between a stretch position and an accommodating position. When the sliding member is in the accommodating position, the second end of the sliding member can be locked with the positioning portion in the locking position. When the positioning portion is in the release position, the second end of the sliding member can be detached from the positioning portion and slid to the stretch position, making the handle member exposed out of the first end of the receiving groove.

In addition, the present invention provides an electronic apparatus, including a housing and a handle structure. The housing includes a receiving groove, and the receiving groove has a first end adjacent to a side edge of the housing and a second end opposite to the first end. The handle structure is pivotally connected to the receiving groove and can be moved opposite to the housing to form a handle mode or a foot mode. The handle structure mainly includes a first cover body, a second cover body, a handle member, and a sliding member. The first cover body includes a joint portion and a positioning portion, and the first cover body is rotatably connected to the second end of the receiving groove by using the joint portion, so that the handle structure can be rotated opposite to the housing to form the foot mode if necessary. The second cover body can be combined with the first cover body to form a receiving space in between, and the second cover body includes a positioning hole, where when the second cover body is combined with the first cover body, the positioning portion is exposed in the positioning hole, and the positioning portion can be moved, opposite to the positioning hole, between a release position and a locking position. The sliding member has a first end and a second end, and the first end of the sliding member is connected to the handle member. The sliding member is slidably received in the receiving space and can be slid between a stretch position and an accommodating position. When the sliding member is in the accommodating position, the second end of the sliding member can be locked with the positioning portion in the locking position. When the positioning portion is in a release position, the second end of the sliding member can be detached from the positioning portion and slid to the stretch position, making the handle member exposed out of the receiving groove, to form the handle mode.

To sum up, for a handle structure and an electronic apparatus according to an embodiment of the present invention, a first cover body of the handle structure is rotatably connected to a receiving groove of a housing to adjust a use angle of the electronic apparatus, so that the handle structure is used as a foot of the electronic apparatus; and a sliding member of the handle structure is slidably combined with the first cover body or a second cover body to drive the handle member to slide, so that the handle structure is used as an extensible handle of the electronic apparatus and facilitates holding of a user, thereby saving packaging and placing space without affecting integral beauty of the appearance of the electronic apparatus.

Detailed characteristics and advantages of the present invention are described below in detail in implementation manners, and the content thereof can make a person skilled in the art learn the technical content of the present invention and perform an implementation according thereto. In addition, according to the content disclosed in the specification, and the range and figures of the patent applied for, a person skilled in the art can readily understand the objectives and advantages related to the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
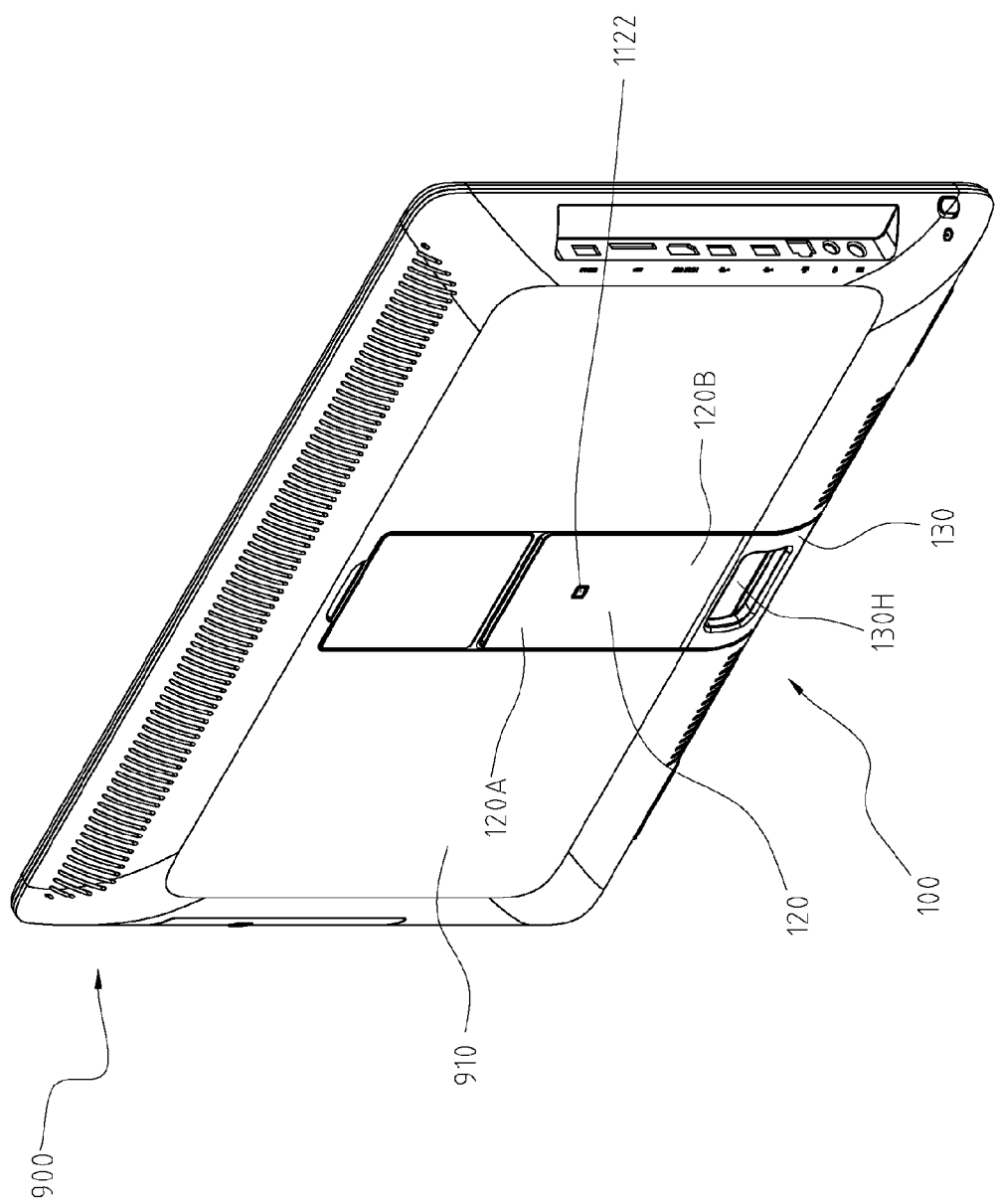
FIG. 1 is a schematic outline overview illustrating that a handle structure is installed in an electronic apparatus according to an embodiment of the present invention.
Figure 2:
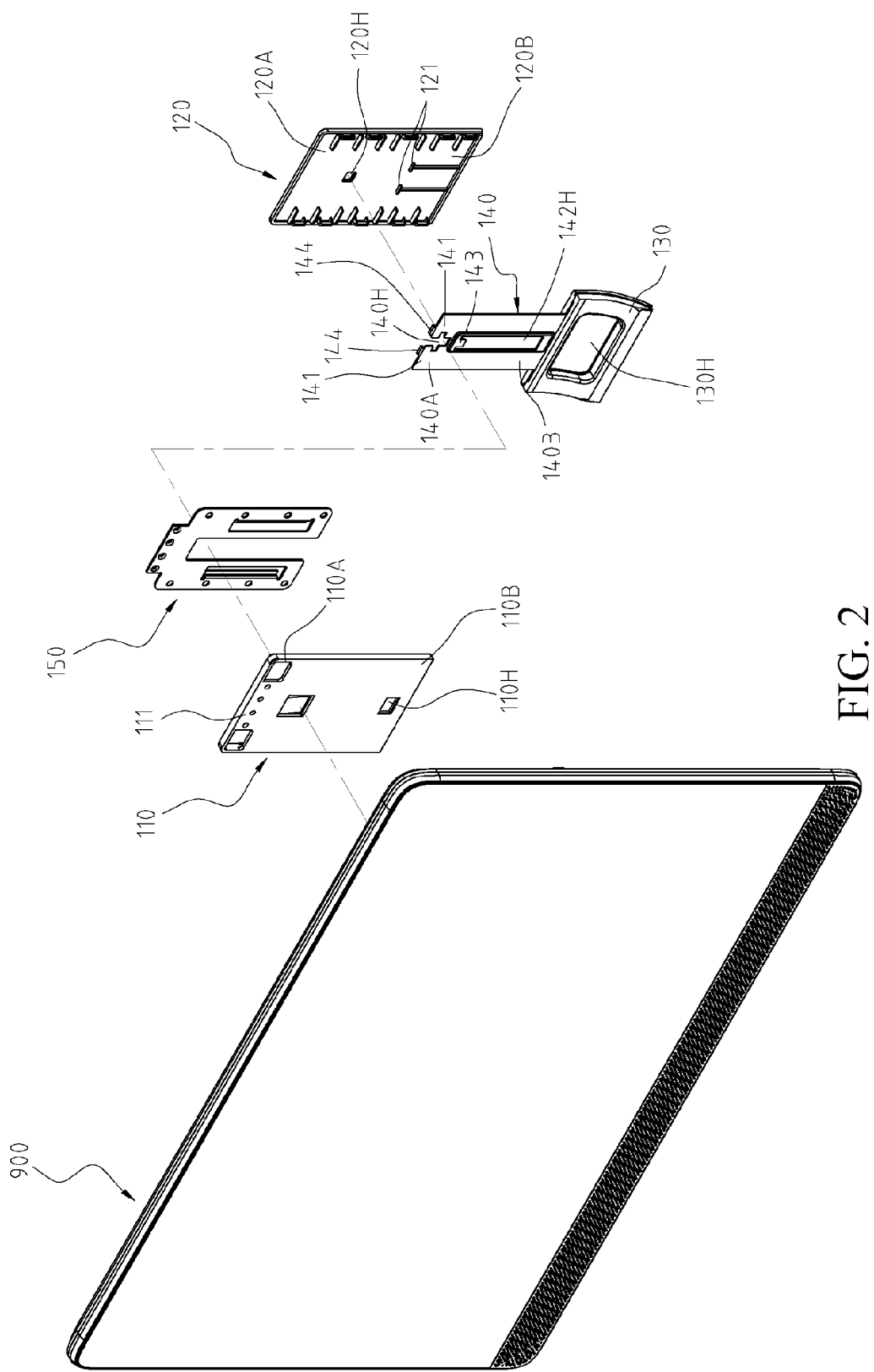
FIG. 2 is a three-dimensional exploded view (1) of a handle structure according to an embodiment of the present invention.

Refer to FIG. 1 to FIG. 5, which are a schematic outline overview of illustrating that a handle structure is installed in an electronic apparatus according to an embodiment of the present invention, a three-dimensional exploded view (1) of a handle structure, a three-dimensional exploded view (2) of a handle structure, a partial enlarged schematic view of a positioning portion of a handle structure, and a schematic overview illustrating that a sliding member of a handle structure is in an accommodating position, respectively, disclosing a handle structure 100 applicable to an electronic apparatus 900. The electronic apparatus 900 includes a housing 910, and the housing 910 is provided with a receiving groove 910C. For convenience of description, one end, which is open and adjacent to a side edge of the housing 910, and the other end, which is closed and located at the inner side of the housing 910, of the receiving groove 910C are indicated by a first end 911 and a second end 912, respectively, so that after one end of the handle structure 100 can be pivotally connected to the second end 912 of the receiving groove 910C, the other end of the handle structure 100 can be slid in or out by using the first end 911 of the receiving groove 910C to form a handle mode or detached from the first end 911 to form a foot mode. Because the receiving groove 910C is configured to receive the handle structure 100, the size and depth of the receiving groove 910C depend on the handle structure 100, so as to retain the appearance of the electronic apparatus 900 provided with the handle structure 100 integrally beautiful.

Figure 3:
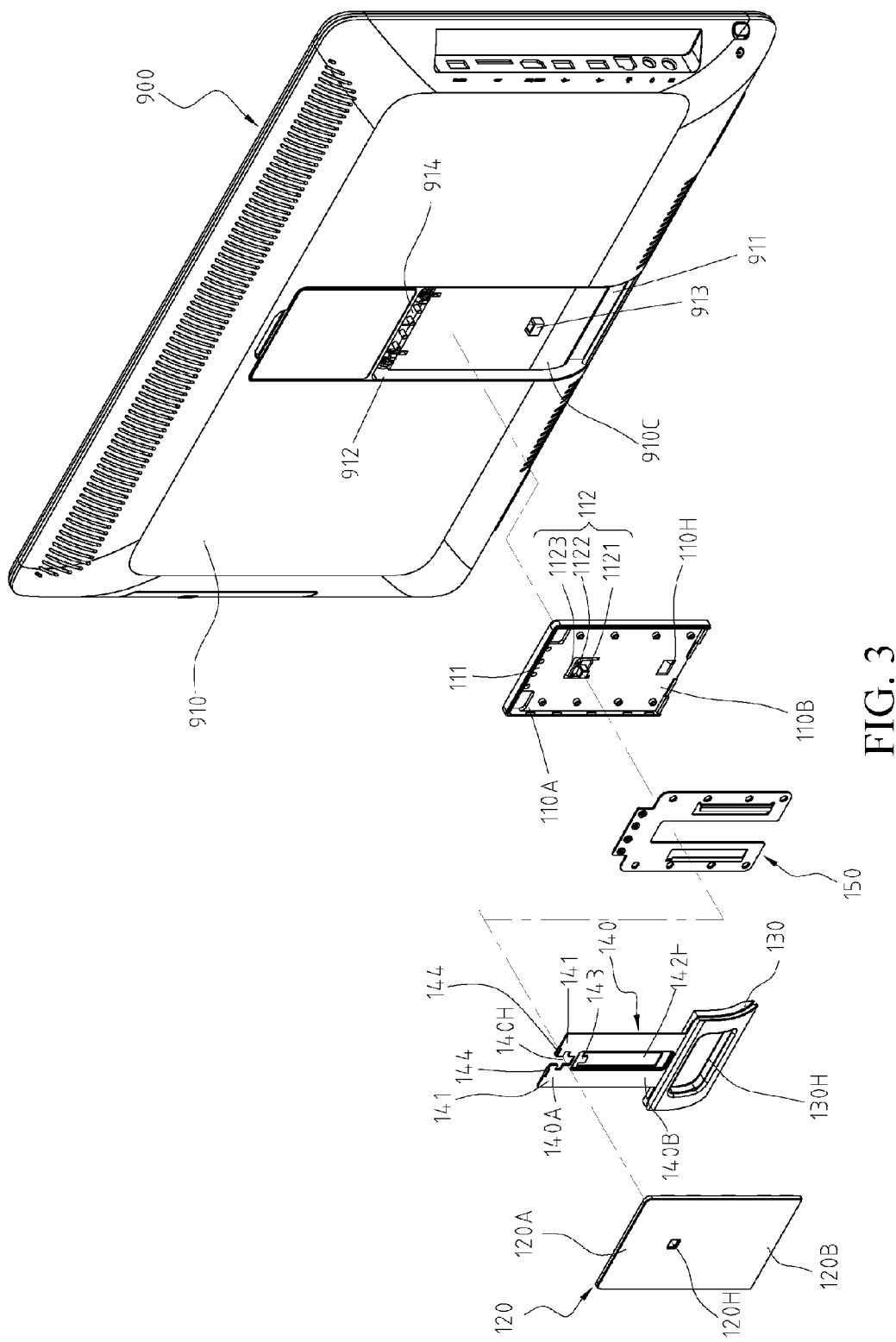
FIG. 3 is a three-dimensional exploded view (2) of a handle structure according to an embodiment of the present invention.

The handle structure 100 includes a first cover body 110, a second cover body 120, a handle member 130, and a sliding member 140, which are described as follows:

The first cover body 110 includes a joint portion 111 and a positioning portion 112. The first cover body 110 is rectangular, and the joint portion 111 is located at a first end 110A of the first cover body 110. The first cover body 110 is rotatably connected to the second end 912 of the receiving groove 910C by using the joint portion 111. As shown in FIG. 3, in the receiving groove 910C, a hinge structure 914 is received and located at the second end 912, and the joint portion 111 of the first cover body 110 is in locked combination with the hinge structure 914, so that the first cover body 110 is rotatably connected to the second end 912 of the receiving groove 910C; however, the present invention is not limited thereto.

Figure 4:
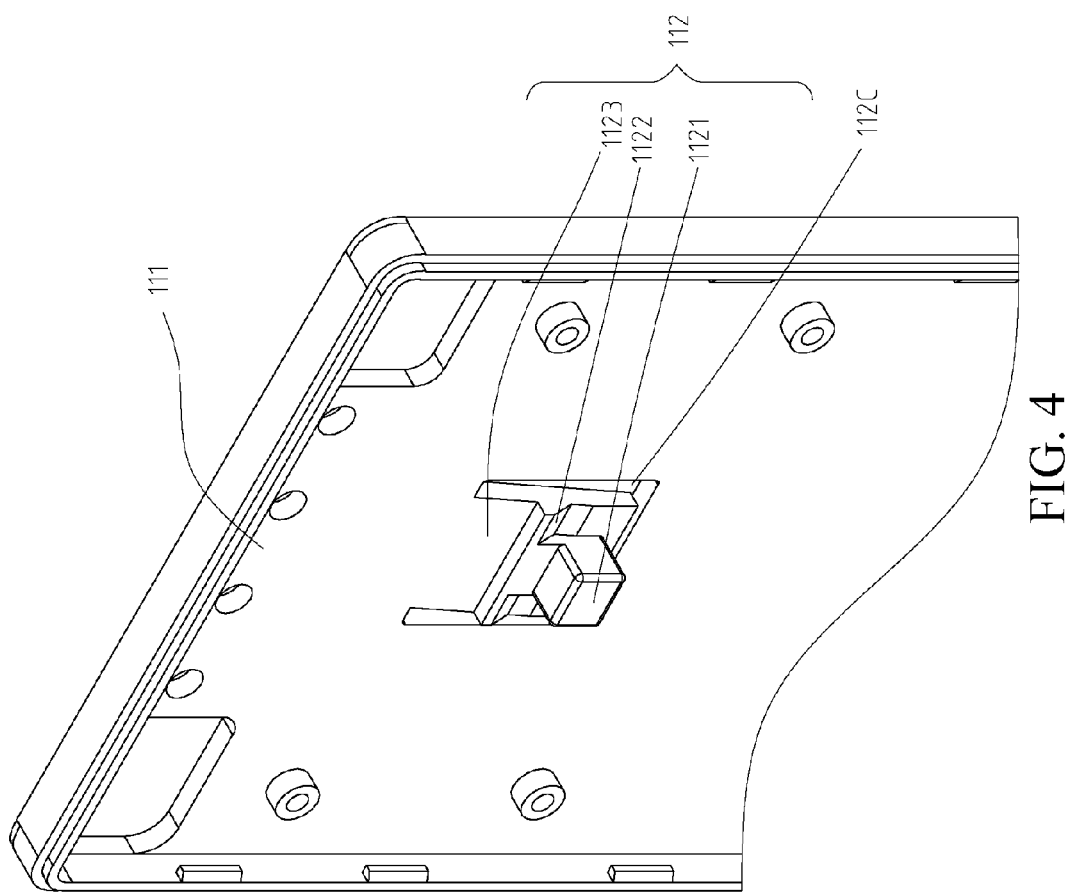
FIG. 4 is a partial enlarged schematic view of a positioning portion of a handle structure according to an embodiment of the present invention.

The positioning portion 112 is disposed in the first cover body 110, and adjacent to where the joint portion 111 is disposed. Referring to FIG. 4, the positioning portion 112 includes a protruding block 1121 and at least one wedge-shaped structure 1122 which are located at one side of the protruding block 1121. An example in which there are two wedge-shaped structures 1122 and the two wedge-shaped structures 1122 are separately located at two sides of the protruding block 1121 is used below for description. The protruding block 1121 perpendicularly protrudes out of the first cover body 110, and the protruding block 1121 extends towards the second cover body 120. In addition, a section groove 112C is disposed around the positioning portion 112, and the section groove 112C is U-shaped, so that by using one end, which is connected to the first cover body 110, of the positioning portion 112 as a rotation shaft, the other end of the positioning portion 112 is moved opposite to the first cover body 110 by using an elastic arm 1123.

The second cover body 120 is also rectangular, and the second cover body 120 can be combined with the first cover body 110 and form a receiving space with the first cover body 110 in between. Therefore, the shape and size of the second cover body 120 both correspond to the first cover body 110. In addition, the second cover body 120 includes a positioning hole 120H. The positioning hole 120H is located at a first end 120A of the second cover body 120, the set position thereof corresponds to the position of the protruding block 1121 of the positioning portion 112. The hole shape and size of the positioning hole 120H also correspond to the shape and size of the protruding block 1121 of the positioning portion 112, so that when the second cover body 120 is combined with the first cover body 110, the protruding block 1121 of the positioning portion 112 is exposed in the positioning hole 120H, and the protruding block 1121 of the positioning portion 112 can be combined with the positioning hole 120H and in a locking position. As shown in FIG. 1, the protruding block 1121 of the positioning portion 112 is located in the positioning hole 120H, and an end surface of the protruding block 1121 is exactly located on a same plane with an external surface of the second cover body 120 or slightly protrudes out of the external surface; however, the present invention is not limited thereto.

Figure 7:
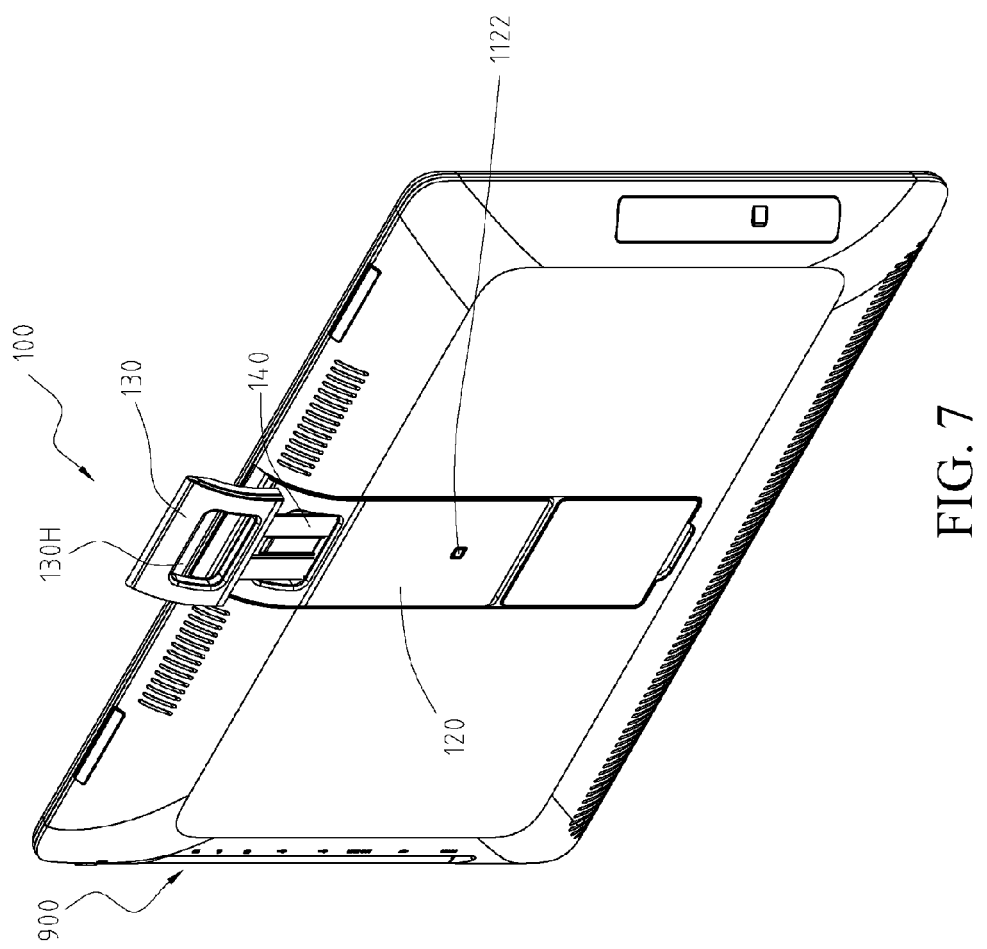
FIG. 7 is a schematic overview illustrating that a sliding member of a handle structure is in a stretch position according to an embodiment of the present invention.

The sliding member 140 is rectangular and sheet-shaped, is slidably received in the first cover body 110 or the second cover body 120, and can be slid between a stretch position (as shown in FIG. 7) and an accommodating position (as shown in FIG. 1). The sliding member 140 has a first end 140A and a second end 140B. The second end 140B of the sliding member 140 abuts the handle member 130. An opening 130H is disposed in the middle of the handle member 130, so that a user can push and pull or hold the handle member 130 by hand by using the opening 130H. In this embodiment, the handle member 130 and the sliding member 140 can be integrally formed.

The handle structure 100 further includes a guide rail component 150. The guide rail component 150 can be disposed in the first cover body 110 or the second cover body 120, so that the sliding member 140 can be slidably combined with the first cover body 110 or the second cover body 120 by using the guide rail component 150. In this embodiment, the guide rail component 150 is disposed in the first cover body 110, and the sliding member 140 is slidably combined with the first cover body 110 by using the guide rail component 150, and as shown in FIG. 7, can be slid to the stretch position, or as shown in FIG. 1, can be slid to the accommodating position.

The sliding member 140 includes a recess 140H and at least one buckle portion 141. An example in which the sliding member 140 has two buckle portions 141 is used below for description. The two buckle portions 141 are located at the first end 140A of the sliding member 140, recessed portions of the buckle portions 141 are opposite to each other in mirror symmetry, and the recess 140H is located between the two buckle portions 141. When the sliding member 140 is in the accommodating position, the recessed portions of the two buckle portions 141 are separately buckled to the two wedge-shaped structures 1122 of the positioning portion 112, so that the first end 140A of the sliding member 140 can be combined with the positioning portion 112. The handle member 130 that is connected to the second end 140B of the sliding member 140 now presses against the second end 110B of the first cover body 110 and the second end 120B of the second cover body 120.

Figure 5:
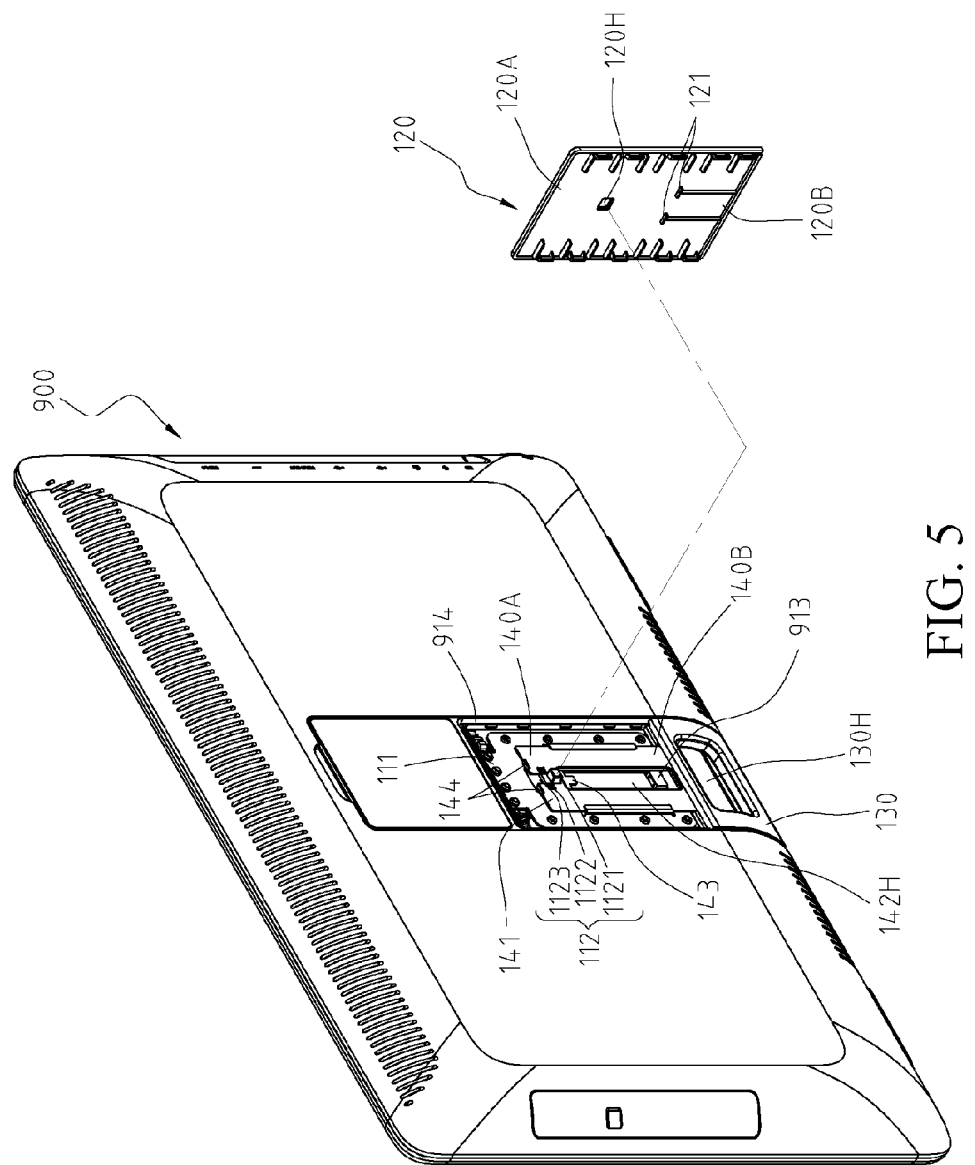
FIG. 5 is a schematic overview illustrating that a sliding member of a handle structure is in an accommodating position according to an embodiment of the present invention.

Therefore, when the sliding member 140 is slid from the stretch position to the accommodating position, the two buckle portions 141 of the sliding member 140 can be buckled to the rear side of the two wedge-shaped structures 1122 separately by using oblique planes of the two wedge-shaped structures 1122 of the positioning portion 112, as shown in FIG. 5. The recess 140H of the sliding member 140 is slightly bigger than the protruding block 1121 of the positioning portion 112, so that when the sliding member 140 is in the accommodating position, the protruding block 1121 of the positioning portion 112 can press against the recess 140H of the sliding member 140, and received in the recess 140H.

Figure 6:
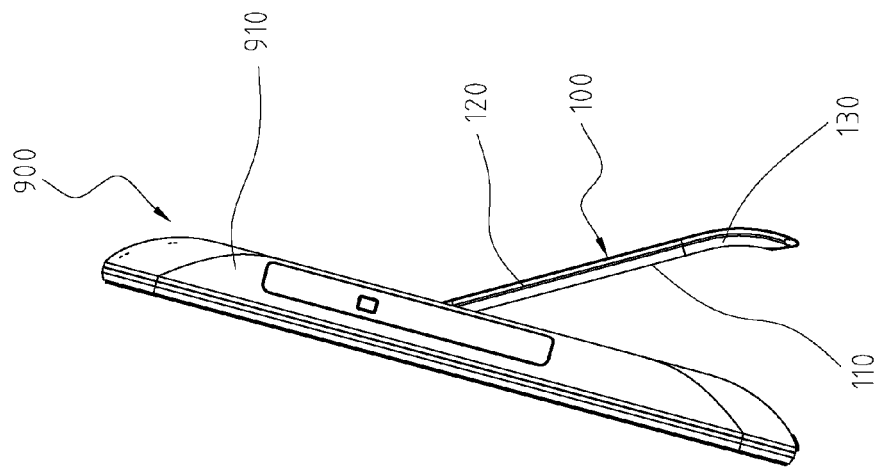
FIG. 6 is a schematic overview illustrating that a handle structure is used as a foot of an electronic apparatus according to an embodiment of the present invention.

Refer to FIG. 6, which is a schematic overview illustrating that a handle structure is used as a foot of an electronic apparatus according to an embodiment of the present invention. In this case, a user does not need to pull the handle member 130 of the handle structure 100 out of the receiving groove 910C, but only needs to rotate the handle structure 100 opposite to the housing 910 of the electronic apparatus and by an angle, so that the handle structure 100 can be used as a foot to provide an angle adjustment function. Therefore, in this case, the protruding block 1121 of the positioning portion 112 is in the locking position, and the sliding member 140 is in the accommodating position.

Refer to FIG. 7, which is a schematic overview illustrating that a sliding member of a handle structure is in a stretch position according to an embodiment of the present invention. When a user wants to hold the electronic apparatus 900, the user can press the protruding block 1121 of the positioning portion 112 through the positioning hole 120H, so that the positioning portion 112 is moved from the locking position to the release position, and therefore, the user can pull the handle member 130 of the handle structure 100 out of the receiving groove 910C, thereby driving the sliding member 140 to slide from the accommodating position slide to the stretch position.

Figure 8:
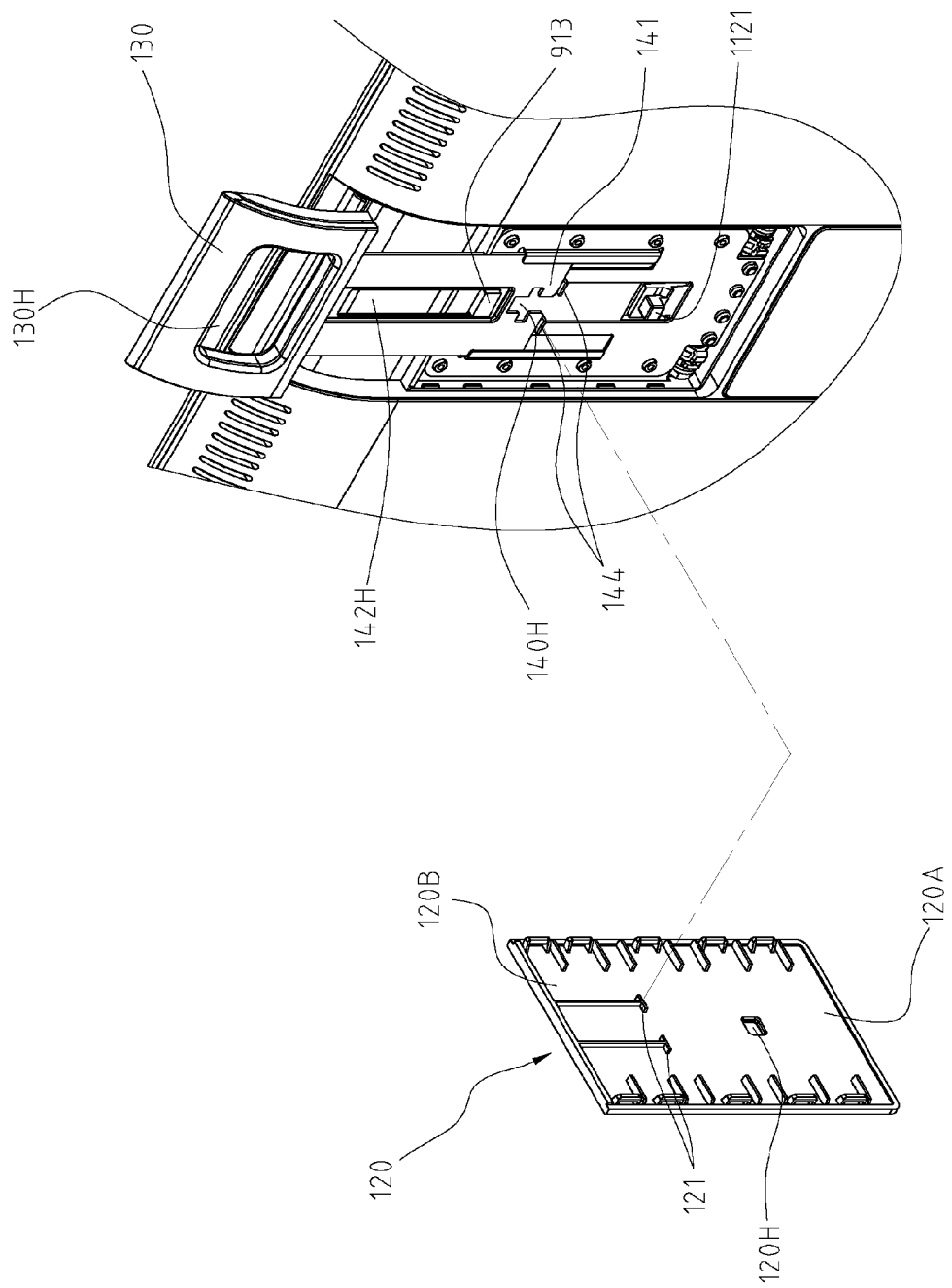
FIG. 8 is a partial schematic overview illustrating that a handle structure is used as a handle of an electronic apparatus according to an embodiment of the present invention.

Refer to FIG. 8, which is a partial schematic overview illustrating that a handle structure is used as a handle of an electronic apparatus according to an embodiment of the present invention. The first cover body 110 or the second cover body 120 of the handle structure 100 further includes at least one stop portion 121, so that when the sliding member 140 is slid to the stretch position, the at least one buckle portion 141 of the sliding member 140 can separately press against the at least one stop portion 121, thereby limiting sliding of the sliding member 140, so as to prevent the sliding member 140 from being entirely detached from the first cover body 110 or the second cover body 120. The number of the stop portions 121 is the same as that of the buckle portions 141, so that the buckle portions 141 can separately press against the stop portions 121; however, the present invention is not limited thereto.

In addition, the sliding member 140 further includes two stop members 144 that are separately disposed in the two buckle portions 141, so that the two buckle portions 141 can press against the two stop portions 121 by using the two stop members 144. Because in this embodiment, that the sliding member 140 is slidably combined with the first cover body 110 is used as an example, the two stop members 144 protrude towards the second cover body 120, so as to stop the sliding member 140.

As can be seen from FIG. 3, the sliding member 140 further includes a hollow area 142H and a tongue piece 143. The tongue piece 143 is located at the first end 140A of the sliding member 140, and protrudes in the hollow area 142H of the sliding member 140 in a direction from the first end 140A of the sliding member 140 to the second end 140B of the sliding member 140. In addition, the housing 910 further includes a slot 913 that is disposed in the receiving groove 910C and adjacent to the first end 911, and the first cover body 110, opposite to the slot 913, is provided with a through hole 110H, so that the slot 913 can protrude in the hollow area 142H of the sliding member 140 through the through hole 110H of the first cover body 110, and a slot opening of the slot 913 faces the tongue piece 143.

Therefore, when the sliding member 140 is slid to the stretch position, the tongue piece 143 of the sliding member 140 can be inserted into the slot opening of the slot 913, so that the sliding member 140 can be buckled to the slot 913 of the housing 910 by using the tongue piece 143, thereby preventing the electronic apparatus 900 from being rotated opposite to the handle structure 100 when a user holds the electronic apparatus 900.

To sum up, for a handle structure and an electronic apparatus according to an embodiment of the present invention, a first cover body of the handle structure is rotatably connected to a receiving groove of a housing to adjust a use angle of the electronic apparatus, so that the handle structure is used as a foot of the electronic apparatus; and a sliding member of the handle structure is slidably combined with the first cover body or a second cover body to drive the handle member to slide, so that the handle structure is used as an extensible handle of the electronic apparatus and facilitates holding of a user, thereby saving packaging and placing space without affecting integral beauty of the appearance of the electronic apparatus.

Figure 9:
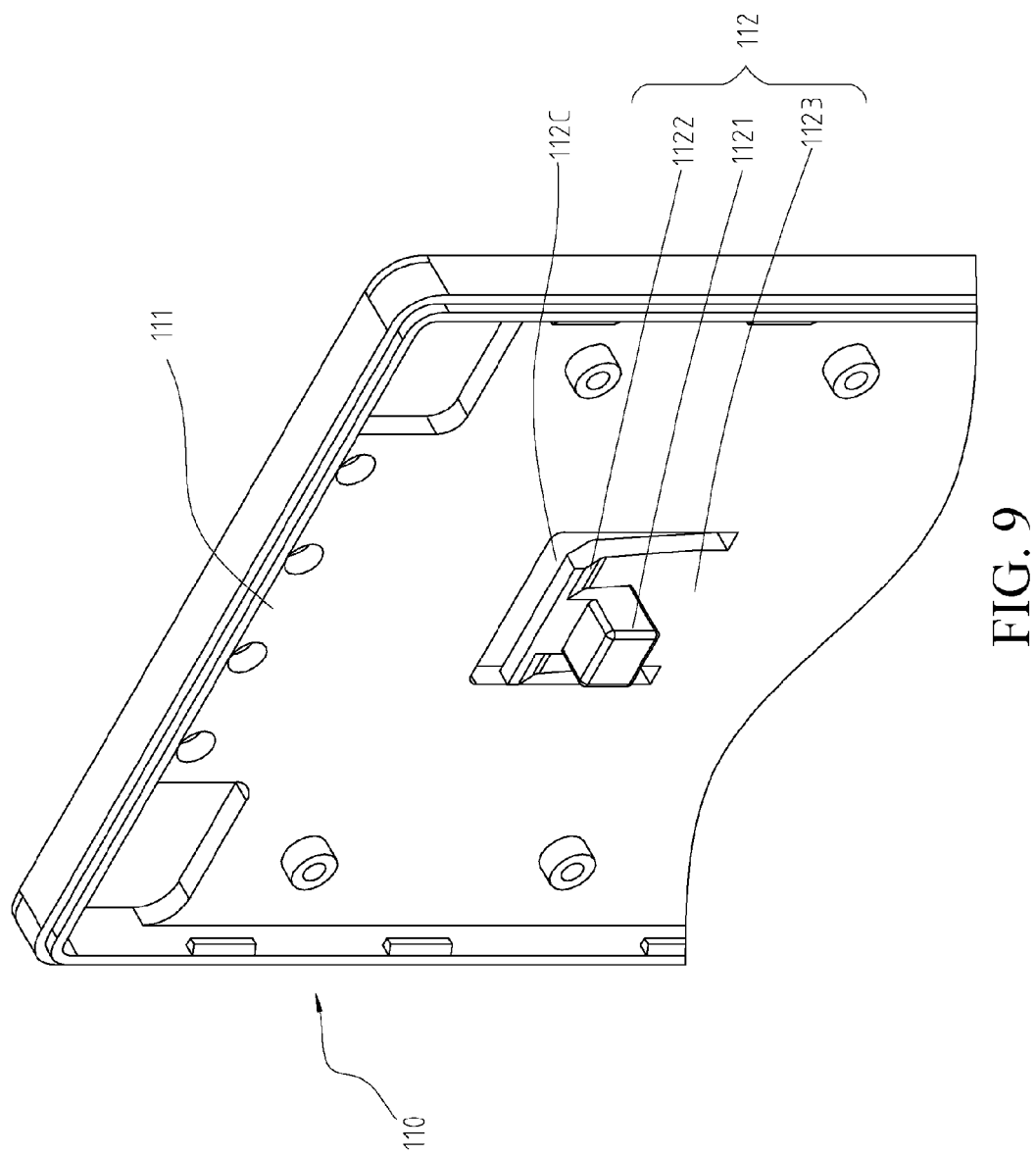
FIG. 9 is a partial enlarged schematic view of a positioning portion of a handle structure according to another embodiment of the present invention.

Further, refer FIG. 9, which is a partial enlarged schematic view of a positioning portion of a handle structure according to another embodiment of the present invention. Structures and components of this embodiment that are the same as those of the previous embodiment are denoted by same component symbols and are not described again. A difference between this embodiment and the previous embodiment lies in the direction of the section groove 112C and the position of the elastic arm 1123 that is connected to the first cover body 110. In the previous embodiment, the section groove 112C is U-shaped, and an opening of the U shape faces the second end 912 of the receiving groove 910C, so that the upper side of the elastic arm 1123 as shown in FIG. 4 is extended and connected to the first cover body 110. However, as shown in FIG. 9, in this embodiment, the section groove 112C is also U-shaped, and an opening of the U shape faces the first end 911 of the receiving groove 910C, so that the lower side of the elastic arm 1123 as shown in FIG. 9 is extended and connected to the first cover body 110. In addition, the two wedge-shaped structures 1122 are therefore located at another end opposite to the elastic arm 1123.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A handle structure, applicable to an electronic apparatus, the electronic apparatus comprising a housing having a receiving groove, the receiving groove comprising a first end adjacent to a side edge of the housing and a second end opposite to the first end, and the handle structure comprising:
a first cover body, comprising a joint portion and a positioning portion, wherein the first cover body is rotatably connected to the second end of the receiving groove by using the joint portion;
a second cover body, which can be combined with the first cover body to form a receiving space in between, the second cover body comprising a positioning hole, wherein when the second cover body is combined with the first cover body, the positioning portion is exposed in the positioning hole, and the positioning portion can be moved, opposite to the positioning hole, between a release position and a locking position;
a handle member; and
a sliding member, having a first end and a second end, wherein the first end of the sliding member is connected to the handle member, and the sliding member is slidably received in the receiving space and can be slid between a stretch position and an accommodating position, wherein when the sliding member is in the accommodating position, the second end of the sliding member can be locked with the positioning portion in the locking position, and when the positioning portion is in the release position, the second end of the sliding member can be detached from the positioning portion and slid to the stretch position, making the handle member exposed out of the first end of the receiving groove.

2. The handle structure according to claim 1, wherein the positioning portion comprises a protruding block and at least one wedge-shaped structure, the at least one wedge-shaped structure is located at one side of the protruding block, the sliding member comprises a recess and at least one buckle portion, the at least one buckle portion is located at the second end of the sliding member, the recess is adjacent to the at least one buckle portion, when the sliding member is slid from the stretch position to the accommodating position, the at least one buckle portion of the sliding member is buckled to the rear side of the at least one wedge-shaped structure by using an oblique plane of the at least one wedge-shaped structure, and the protruding block is received in the recess.

3. The handle structure according to claim 2, wherein when the sliding member is in the accommodating position, the protruding block is located and exposed in the positioning hole.

4. The handle structure according to claim 2, wherein one of the first cover body and the second cover body further comprises at least one stop portion, and when the sliding member is in the stretch position, the at least one buckle portion of the sliding member separately presses against the at least one stop portion.

5. The handle structure according to claim 1, further comprising a guide rail component, disposed in one of the first cover body and the second cover body, wherein the sliding member is slidably combined with one of the first cover body and the second cover body by using the guide rail component.

6. The handle structure according to claim 1, wherein the sliding member comprises a hollow area and a tongue piece, wherein the tongue piece protrudes in the hollow area in a direction from the second end of the sliding member to the first end of the sliding member, and the first cover body further comprises a through hole for a slot in the housing to protrude and extend in the hollow area, so that the tongue piece can be inserted into the slot when the sliding member is slid to the stretch position.

7. An electronic apparatus, comprising:
a housing, comprising a receiving groove, the receiving groove having a first end adjacent to a side edge of the housing and a second end opposite to the first end; and
a handle structure, pivotally connected to the receiving groove and can be moved opposite to the housing to form a handle mode or a foot mode, comprising:
a first cover body, comprising a joint portion and a positioning portion, wherein the first cover body is rotatably connected to the second end of the receiving groove by using the joint portion, so that the handle structure can be rotated opposite to the housing to form the foot mode if necessary;
a second cover body, which can be combined with the first cover body to form a receiving space in between, the second cover body comprising a positioning hole, wherein when the second cover body is combined with the first cover body, the positioning portion is exposed in the positioning hole, and the positioning portion can be moved, opposite to the positioning hole, between a release position and a locking position;
a handle member; and
a sliding member, having a first end and a second end, wherein the first end of the sliding member is connected to the handle member, and the sliding member is slidably received in the receiving space and can be slid between a stretch position and an accommodating position, wherein when the sliding member is in the accommodating position, the second end of the sliding member can be locked with the positioning portion in the locking position, and when the positioning portion is in the release position, the second end of the sliding member can be detached from the positioning portion and slid to the stretch position, making the handle member exposed out of the first end of the receiving groove, so as to form the handle mode.

8. The electronic apparatus according to claim 7, wherein the positioning portion comprises a protruding block and at least one wedge-shaped structure, wherein the at least one wedge-shaped structure is separately located at one side of the protruding block, the sliding member comprises a recess and at least one buckle portion, the at least one buckle portion is located at the second end of the sliding member, and the recess abuts the at least one buckle portion, wherein when the sliding member is slid from the stretch position to the accommodating position, the at least one buckle portion of the sliding member is buckled to the rear side of the at least one wedge-shaped structure separately by using an oblique plane of the at least one wedge-shaped structure, and the protruding block is received in the recess.

9. The electronic apparatus according to claim 8, wherein when the sliding member is in the accommodating position, the protruding block is located and exposed in the positioning hole.

10. The electronic apparatus according to claim 8, wherein the first cover body or the second cover body further comprises at least one stop portion, and when the sliding member is in the stretch position, the at least one buckle portion of the sliding member separately presses against the at least one stop portion.

11. The electronic apparatus according to claim 7, further comprising a guide rail component, disposed in one of the first cover body and the second cover body, wherein the sliding member is slidably combined with one of the first cover body and the second cover body by using the guide rail component.

12. The electronic apparatus according to claim 7, wherein the sliding member comprises a hollow area and a tongue piece, wherein the tongue piece protrudes in the hollow area in a direction from the second end of the sliding member to the first end of the sliding member, the housing further comprises a slot, the first cover body further comprises a through hole, the slot protrudes in the hollow area of the sliding member through the through hole, and an opening of the slot faces the tongue piece, so that the tongue piece can be inserted into the slot when the sliding member is slid to the stretch position.

* * * * *